Jan. 12, 1943.  W. G. McALLISTER  2,308,422
SLIDE WIRE POTENTIOMETER
Filed Feb. 9, 1940  2 Sheets-Sheet 1

INVENTOR
Walter G. McAllister
BY
Blair, Curtis & Hayward
ATTORNEYS

Jan. 12, 1943. W. G. McALLISTER 2,308,422
SLIDE WIRE POTENTIOMETER
Filed Feb. 9, 1940 2 Sheets-Sheet 2
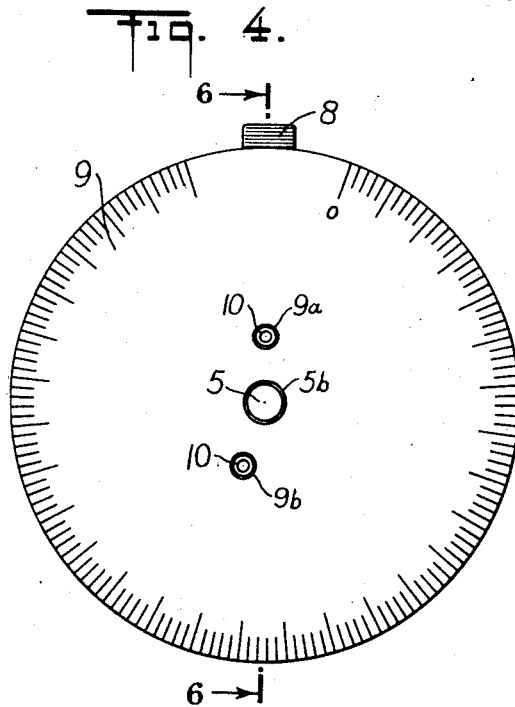
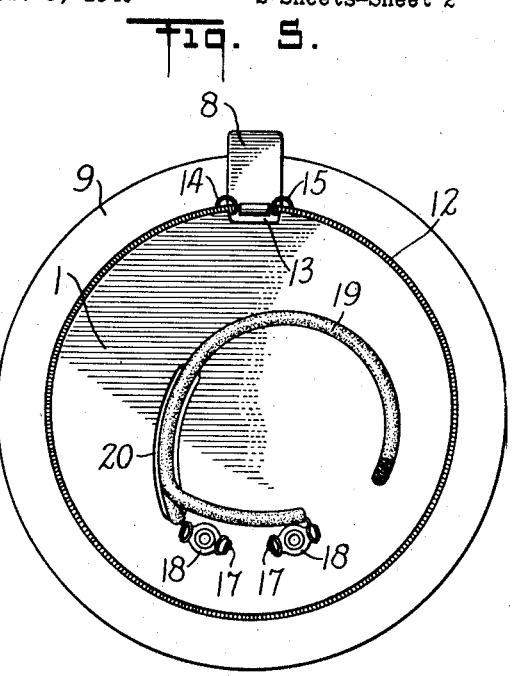
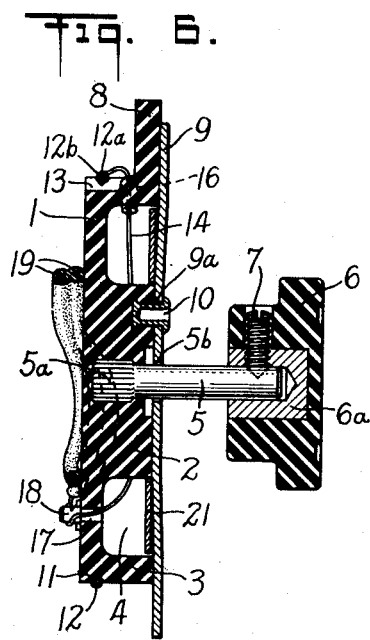
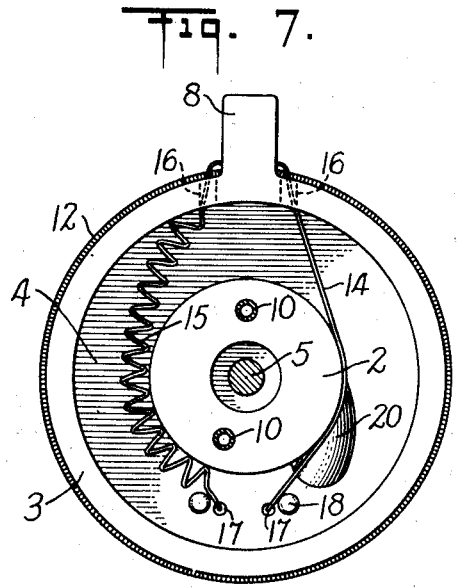
INVENTOR
Walter G. McAllister
BY
Blair, Curtis + Hayward
ATTORNEYS Patented Jan. 12, 1943

2,308,422

UNITED STATES PATENT OFFICE 2,308,422

SLIDE WIRE POTENTIOMETER

Walter G. McAllister, Foxboro, Mass., assignor to The Foxboro Company, Foxboro, Mass., a corporation of Massachusetts Application February 9, 1940, Serial No. 318,092

6 Claims. (Cl. 201—55)

This invention relates to slide wire assembly units for electrical measuring instruments wherein the adjustment of the slide wire resistance is indicated by a dial which, in turn, indicates the value being measured or controlled by the unit.

Manually adjustable instruments of this type usually have an electric circuit in which a balance may be established betwen a variable resistance and a condition-responsive element, such as a thermocouple, responsive to the value of the condition being indicated or controlled. The value of the condition when the circuit is in balance is thus indicated by the setting of the resistance. A common means for obtaining this adjustability and indication is as follows:

A movable scale or dial plate is provided either on the face of the instrument or visible at the face of the instrument suitably calibrated with reference to a fixed reference point for the condition which is being measured or controlled. For example, if the instrument is a temperature controller, the dial plate would be calibrated in degrees Fahrenheit or centigrade. The dial plate is rigidly mounted on a suitable member supporting a resistance element in the form of a slide wire adapted to cooperate with a fixed contact on the frame of the instrument in such manner that rotation of the dial effects a variation in the resistance of some portion of an electric circuit within the instrument. It is apparent that the accuracy of the setting of the instrument to indicate a particular condition will in large measure depend upon a nice correspondence between the dial markings and points along the slide wire of equivalent resistance value.

In the past, slide wire units of the above general character were made of numerous separate parts requiring a high degree of care and skill for accurate assembly. They usually included a base plate mounted on a shaft adapted to be rotated in a bearing member carried by a panel board or frame. This base plate carried the slide wire resistance mounted in a suitable groove formed in the plate. A dial or scale disc was secured to the front side of the base plate, usually by means of screws which, passing through openings in the scale disc, engaged threaded holes in the plate. During assembly it was necessary accurately to secure the resistance element in proper position on the base and then properly position and adjust the scale plate in appropriate relation to the resistance element.

Since the readings of the scale must bear a known relation to a reference mark and an electric contact on the frame, cooperative stop devices were attached to the rotative member and to the frame. Because of the difficulty of properly adjusting the several parts of the device during assembly, the accuracy of each instrument turned out has to a considerable degree depended upon the skill and careful attention of the workman making the assembly. Mass production of such instruments has accordingly been difficult and their manufacture costly.

It is an object of the present invention to provide a slide wire assembly of simple and inexpensive construction which can be manufactured by mass production methods with great precision and accuracy and without the employment of skilled labor.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of my invention;

Fig. 4 is a front view of an unmounted slide wire assembly showing the calibrated scale plate and shaft for the manipulating knob;

Fig. 5 is a rear view thereof;

Fig. 6 is a section taken on the line 6—6 of Fig. 4; and

Fig. 7 is a front view of the assembly with the scale plate and knob removed.

Similar reference characters refer to similar parts throughout the several views of the drawings.

Figure 1:
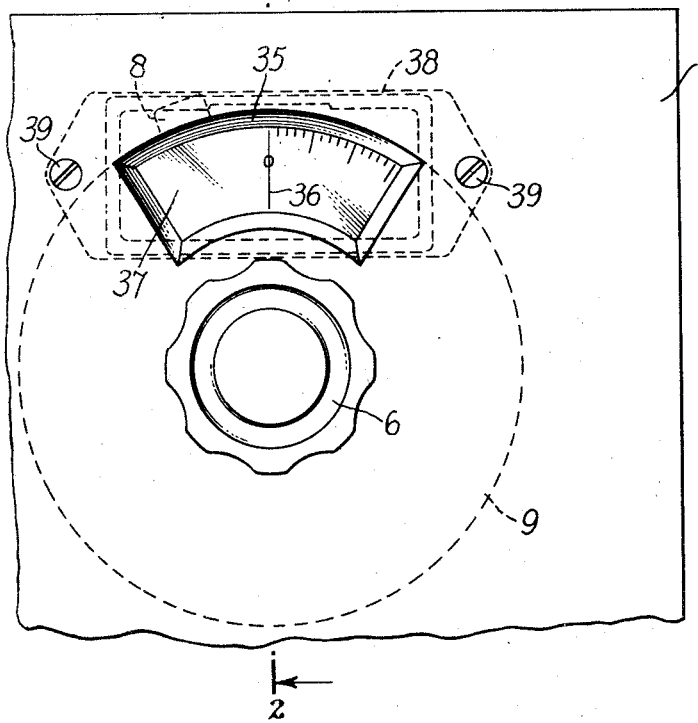
Fig. 1 is a front view of a portion of the frame of an electric control instrument showing the slide wire assembly operatively mounted thereon, the scale plate being indicated in its zero position.
Figure 2:
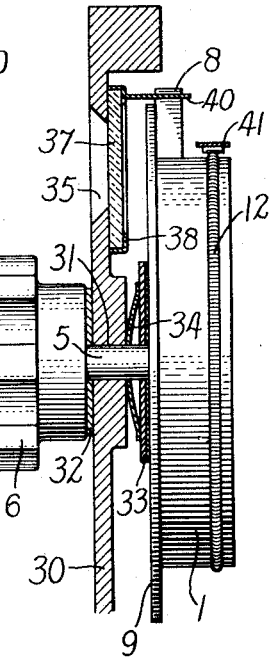
Fig. 2 is a cross-section taken on line 2—2 of Fig. 1.
Figure 3:
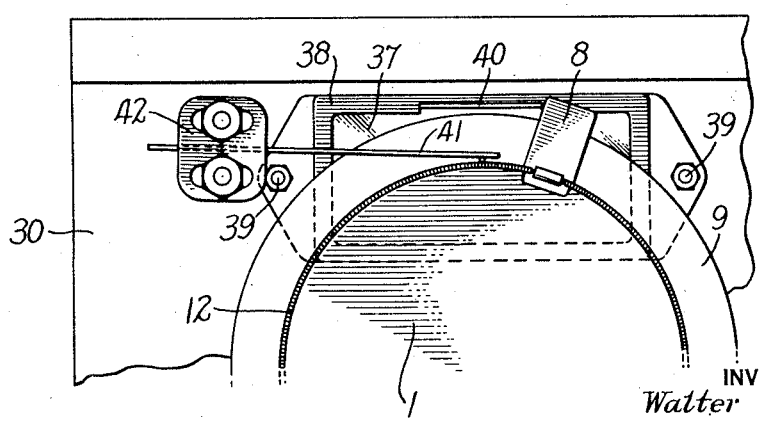
Fig. 3 is a rear view of the mounted assembly in the same position as in Fig. 1.

Referring to the drawings, and more particularly to Figs. 1 to 3, the assembly unit comprising a molded block 1, a shaft 5, a manipulating knob 6, a dial or scale plate 9 and a slide wire resistance element 12, is shown rotatably mounted upon a portion of the frame 30 of a control instrument of the character hereinbefore mentioned. The frame is provided with an opening 31 in which the shaft 5 of the slide wire assembly is rotatable. Referring to Fig. 2, it will be seen that two fiber or other suitable washers 32, 33 are interposed respectively between the knob 6 and the front of the frame, and the scale plate 9 and the back of the frame, a spring member or washer 34 being further interposed between the back of the frame 9 and the washer 33 to take up end play and provide sufficient friction to prevent unwanted or accidental movement of the unit.

The frame is provided with a window 35 through which the face of the scale plate 9 may be observed, and its scale readings or calibrations seen in their relation to a hairline or other index means 36. The hairline 36 is preferably formed or marked upon a glass window 37 held rigidly in a frame 38 in proper position behind the window opening 35. Frame 38 is secured to the back of the instrument panel or frame 30 by means of screws 39. Extending rearwardly from the upper portion of the window frame 38 is a projection 40 which serves as a stop to limit rotation of the slide wire assembly in either direction in relation to the reference line 36. This stop 40 cooperates with a projection 8 to which reference will be made hereinafter.

As shown in Fig. 3, a slide wire contact member 41, forming part of an electric circuit of the control instrument, is mounted on the back of the frame 30 so as to make sliding contact with the slide wire resistance element 12 as the latter is moved between the limits of its minimum and maximum resistance values. This resilient contact member 41 is preferably adjustably mounted, as indicated at 42 in Fig. 3, in order that slight adjustments may be made to insure precisely accurate correspondence between the calibrations of the scale and equivalent points of the slide wire resistance member.

Referring to Figs. 4 to 7, it will be seen that the shaft 5, the slide wire resistance element 12, and the scale plate 9 all form an integral unit with the block 1 which is preferably molded from a plastic substance such as that known to the trade under the trade-mark "Bakelite." This molded block is so formed that the slide wire resistance may be readily secured thereon in proper position, and is further provided with means for positively and correctly positioning and holding the scale plate with its calibrations in proper relation to the resistance element. This molded block further provides, as part of its unitary structure, the abutment 8 which, as stated above, cooperates with the stop 40 on the frame to limit rotation of the slide wire assembly.

The molded block 1 has a plain circular base from the front side of which extend concentrically with respect to one another a cylindrical hub 2 and a relatively narrow annular rim 3, thus providing an annular recess 4 within the walls of the block which serves a purpose to be hereinafter mentioned. The shaft 5 extends outwardly from the center of the molded block upon the same side as the hub 2 and rim 3. This shaft is made integral with the block during the molding of the latter and may be provided with a serrated end, as indicated at 5a in order that a firm bond may be established between the shaft and the plastic material from which the block is molded. The knob 6, for rotating the unit, may be made of the same material as the molded block or from any other suitable material. A metallic bushing 6a formed within the knob fits snugly over the free end of the shaft 5. A set screw 7 or other suitable means may serve to hold knob 6 rigidly upon shaft 5. Extending upwardly from the molded block and substantially flush with the face of the annular rim 3, is the rectangular projection 8, referred to above as the means for limiting rotation of the slide wire assembly.

In order that the dial plate 9 may be correctly positioned upon the face of the block 1 without chance of error, this plate, in addition to a hole 5b for the accommodation of shaft 5, is provided with perforations 9a and 9b registrable, when and only when the dial plate occupies its proper relation to the block 1, with a pair of rivets 10, inset in the hub 2 of the molded block 1 during the formation of the block, thus forming an integral part thereof. When the scale plate has been properly set, the free ends of these rivets are upset or peened to hold the dial plate firmly in place.

As shown in Fig. 6, the face of the hub 2 is not quite flush with the face of the rim 3. The difference between the planes of these two faces is somewhat exaggerated in the drawings, for in actual practice the face of the hub would lie below the plane of the rim about one one-hundredth of an inch. The purpose of this construction is to prevent waviness at the outer portions of the scale plate which carry the calibration marks. Prevention results from the fact that when the dial plate is riveted tightly to the face of the hub, the center of the dial plate will be slightly deflected, thus causing the circumferential portion of the plate to bear equally on all portions of the rim. It is to be noted that the rivets 10 and rivet holes 9a and 9b are not disposed diametrically with respect to one another but are set asymmetrically or one of such alignment, thus eliminating the possibility of the dial plate being set upside down.

The slide wire resistance 12 is formed as a ring, in a well known manner, after the resistance wire has first been wound upon a core 12a of copper wire which is insulated with silk or other suitable material. On this core the resistance wire 12b is helically wound so as to have uniform resistance value per unit of length. The ends of the core, after being bent to form a ring, extend slightly beyond the resistance winding and are fastened together after the resistance element has been placed in proper position, in a V-shaped groove 11, formed in the periphery of the molded block, the position of the groove being determined within close limits of accuracy for diameter and concentricity. To facilitate the soldering together of the ends of the core and to insure that the soldered joint occupies a definite position in respect to other fixed points, such as the rivets for holding the scale plate, the block 1 is formed with a notch 13 which intersects the V-shaped groove 11 at a point centrally and symmetrically related to the position of the projection 8. This notch not only insures proper positioning of the resistance element but greatly facilitates the soldering of the two ends of the core.

Near the base of the projection 8, the rim 3 is perforated as at 16, 16. These perforations are so positioned with respect to the end turns of the resistance wire upon its core, that the extended ends or leads 14 and 15 of this wire may be readily passed through the perforations into the annular recess 4. Other holes 17, 17, located substantially diametrically opposite the holes 16, 16, pass through the base of the molded block forming passageways for the end wires between the annular recess 4 and the rear face of the block, where the leads may be secured to connections 18, 18 (see Figs. 5 and 6).

Measuring from the zero resistance end, this type of potentiometer or rheostat has a point of predetermined resistance which must correspond with the zero or minimum reading on the scale. This point should register with the contact point of the contact member on the frame when the resistance unit has been rotated to bring its zero or minimum reading into alignment with the reference mark on the frame. It is accordingly desirable to have the free lead 14 of the resistance at the zero resistance end of the slide wire member of substantially a predetermined resistance value in order that any and every slide wire of standard construction may be quickly mounted upon its support, and have the contact point for zero reading occupy a position definitely related to the position of the stop member 8. The lead 14 is passed through the appropriate perforation 16, and then around the hub and through the appropriate perforation 17 and finally connected to the proper connections. Similarly the lead 15 is passed through its appropriate block perforations 16, 17 and then connected to its appropriate terminal 18, the surplus wire being coiled and disposed within the recess 4. Thus the leads of the resistance wire are received and protected within a receptable formed in the molded block. To further protect these wires and prevent them from coming in contact with the scale plate, a fiber or other insulating washer or gasket 21 is placed over these end wires in the recess 4 before the scale plate is riveted in position. It will be understood that after placing the slide wire in its V notch, it may be secured therein by any suitable adhesive material.

Since it is desirable to have all slide wires used with a particular type of instrument and circuit completely interchangeable, they must have uniform resistance value per unit length, and the over-all resistance of all slide wires including their end leads must be the same. Equal over-all resistance value for every slide wire when assembled in any instrument may be attained by adjusting the length of the end 15.

From the terminal posts 18 suitable outside leads 19 may extend for connection with terminal posts within the instrument itself. Since in the rotation of the slide wire assembly it is desirable that as little strain as possible be placed upon these leads, a somewhat curved groove is molded or formed in the rear face of the block 1, to form a seat for the outside leads as they leave the terminal posts 18, and give to these leads an initial curvature or bend. This serves to preform the lead wires 19 to such shape that as the slide wire unit is rotated about its axis the outside leads tend readily to assume an expanding and contracting helical form. The above mentioned seat or groove is indicated by the reference numeral 20 in Figs. 5 and 6.

From the above description it will be seen that the present invention provides an unusually compact unit which can be easily and accurately assembled, the proper alignment of the dial plate and slide wire is insured by making the stop 8 and the rivets 10 integral with the molded piece 1, any tendency toward irregular deflection of the dial plate is eliminated, and other objects and advantages are efficiently and practically attained.

I claim:

1. In a slide wire potentiometer element, in combination, a unitary molded block comprising concentric hub and rim portions extending from the front side of a plane circular base and forming an annular recess therebetween, the said rim extending slightly beyond said hub, a slide wire resistance mounted on said block, a calibrated scale plate adapted to rest upon said rim and to be centrally deflected and drawn tightly against said hub, and means for holding said scale plate in deflected position against said hub to prevent waviness of the circumferential portions of said plate.

2. In a slide wire potentiometer, a unitary molded block comprising a plane circular base with hub and rim portions extending from the front side thereof, an annular recess being thus formed between the hub and rim portions, a pair of terminal members mounted on the back of said base, a slide wire resistance generally circular in form mounted on the periphery of said molded block, said molded block having a plurality of perforations therein, said resistance having extended ends which pass through perforations in said block to occupy protected positions within said annular recess and which ends then pass through other of said perforations and are made fast to said terminal members mounted on the back of said base.

3. In a slide wire potentiometer, a unitary block of insulating material having hub and rim portions extending from the front side thereof to thereby form an annular recess between the hub and rim portions, said block having a peripheral groove extending around said rim portion and having a first pair of perforations through said rim portion to said annular recess, said block having a second pair of perforations which are positioned in predetermined spaced relationship with respect to said first pair of perforations, terminal means on the back of said base, and a slide wire resistance unit generally circular in form and mounted in said peripheral groove on said block and having extended ends which pass through said first pair of perforations into said recess wherein the extended ends extend to and through said second pair of perforations where they are made fast to said terminal means on the back of said base.

4. In a slide wire potentiometer, the combination of, a block of insulating material having an annular recess formed by hub and rim portions extending from the front side thereof with the rim portion extending slightly beyond the hub portion, a slide wire resistance unit generally circular in form mounted at said rim portion and having extended ends which occupy protected positions in said annular recess and which provide electrical connections for the resistance unit, a calibrated scale plate on the front side of the block with substantially the outer edge of the scale plate resting upon said rim portion, and attaching means rigidly holding the center of said scale plate to said hub portion.

5. In a slide wire potentiometer in which a slide wire resistance is rotatably mounted upon a frame member and is moved with respect to a contactor and wherein there is a scale reading reference mark, a mounting frame, a contactor mounted on said frame, a unitary block of insulating material mounted for rotation on said frame and having integral stop means to limit rotation, a resistor fixedly mounted on said block and positioned with respect to said contactor and said stop means such that there is a predetermined relation established as to maximum and minimum resistance values, said block having hub and rim portions extending from the face thereof to thereby provide an annular recess with rim portion extending beyond said hub portion, a calibrated scale plate mounted on the front side of said block in predetermined calibrated relation to said resistance and said stop means and in cooperative relation with said reference mark, and attaching means rigidly holding the center of said scale plate to said hub portion so that said scale plate is slightly dished inwardly at its center with its outer portion resting against the rim portion of said block.

6. In a slide wire potentiometer, in which a slide wire resistance is rotatably mounted upon a frame member comprising a fixed rotation limiting stop, a fixed contact, and a scale reading reference mark; a unitary molded block adapted for rotation on said frame member and comprising, a plane circular base having extending from the front side thereof concentric hub and rim portions to thereby form an annular recess therebetween, said block having a preformed groove for holding the resistance in cooperative relation to the fixed contact, an integral abutment for co-operating with said fixed stop to limit rotation of said block in predetermined relation to minimum and maximum resistance values, a plurality of rivets integrally set in said hub portion and adapted to register with perforations in a scale plate for holding the scale plate against the hub portion, said rim portion extending slightly beyond the said hub portion so that the scale plate rests against said rim portion and is drawn tightly against said hub portion by said rivets in predetermined calibration relation to said resistance and in co-operative relation with said reference mark.

WALTER G. McALLISTER.